United States Patent [19]

Tooze

[11] Patent Number: 4,626,851
[45] Date of Patent: Dec. 2, 1986

[54] AIRCRAFT DISPLAY DEVICES

[75] Inventor: Michael J. Tooze, Kent, England

[73] Assignee: GEC Avionics Limited, England

[21] Appl. No.: 669,318

[22] Filed: Nov. 7, 1984

[30] Foreign Application Priority Data

Nov. 9, 1983 [GB] United Kingdom ............... 8329887

[51] Int. Cl.⁴ .................. G01C 21/00; G01C 23/00
[52] U.S. Cl. .............................. 340/975; 73/178 R;
340/784; 340/971; 340/973; 340/974; 434/51
[58] Field of Search .............. 73/178 R; 33/328;
340/967, 974, 975, 705, 784, 971, 973; 358/104;
364/434; 434/51; 244/1 R

[56] References Cited

U.S. PATENT DOCUMENTS

| 2,823,378 | 2/1958 | Reedy et al. ............ 73/178 R |
| 3,018,661 | 1/1962 | Meredith et al. ........ 73/178 R |
| 3,337,845 | 8/1967 | Hart ....................... 340/974 |
| 4,198,810 | 4/1980 | Fahrenschou ........... 340/765 |
| 4,247,843 | 1/1981 | Miller et al. ............ 340/973 |
| 4,371,870 | 2/1983 | Biferno .................... 340/784 |
| 4,463,355 | 7/1984 | Schultz et al. .......... 340/971 |

FOREIGN PATENT DOCUMENTS

| 0115199 | 10/1978 | Japan ............................... 340/784 |
| 2108746 | 5/1983 | United Kingdom ............ 340/784 |

Primary Examiner—James L. Rowland
Assistant Examiner—Brent A. Swarthout
Attorney, Agent, or Firm—Kirschstein, Kirschstein, Ottinger & Israel

[57] ABSTRACT

An aircraft attitude display device comprising: a circular array of radially extending selectively activatable display elements (5), the radially inner ends of which constitute a boundary defining a central space; within the said central space, a fixed aircraft symbol (7); and means for selectively activating the said display elements in accordance with aircraft attitude so that the selected display elements form a visible pattern, e.g. a sector of the array, bearing a geometrical relationship with respect to the aircraft symbol indicative of the aircraft attitude.

The device is suitable for implementation using liquid crystal display technology to give a stand-by display of aircraft pitch and roll which is readily understandable by pilots since it is similar to the display given by conventional rolling ball action aircraft attitude instruments.

8 Claims, 13 Drawing Figures

AIRCRAFT DISPLAY DEVICES

This invention relates to aircraft display devices.

More particularly the invention relates to display devices suitable for use as standby attitude reference displays in aircraft.

The provision of a standby attitude reference display in a modern aircraft cockpit poses a number of problems. The conventional standby electro-mechanical gyro instrumentation has low reliability leading to high maintenance costs and the possibility of uncertainty as to which instrument to follow when only one standby is available as is often the case in a fighter aircraft due to considerations of cockpit space.

To meet this problem it has been proposed to use for a standby attitude reference a high reliability display device, such as a liquid crystal display, comprising an array of selectively activatable fixed display elements, and to control the selective activation of elements using appropriate ones of the range of aircraft body motion sensors which are incorporated in the complex flight control and other systems provided in modern aircraft.

The difficulty then arises of obtaining with such a relatively simple display device, a display which permits easy transition from the primary attitude display and fits ergonomically into cockpit operation, and which presents to a pilot a readily interpretable, unambiguous and natural attitude representation. In this connection it is desirable in a modern aircraft that the standby attitude reference display should not merely be capable of use as a 'get you home' facility, but should also be capable of use as a recovery instrument i.e. to enable the pilot to recover the aircraft from extreme attitudes.

It is an object of the present invention to provide a display device suitable for use as a standby attitude reference display which overcomes these difficulties.

According to the present invention a display device for an aircraft comprises: a circular array of radially extending selectively activatable display elements, the radially inner ends of which elements define a central space; within the said central space, a symbol fixed with respect to the aircraft in use; and means for selectively activating said display elements in accordance with aircraft attitude whereby the selected display elements form a visible pattern whose geometrical relationship with respect to said symbol is indicative of the aircraft attitude.

Preferably said means for selectively activating said display elements is arranged to activate a group of said elements which together form a sector of said circular array whose angular position in the array relative to said symbol is indicative of the roll angle of the aircraft. Preferably said sector rotates about said symbol with changes in the roll angle of the aircraft so that the middle part of said sector tends to remain substantially vertically below said symbol.

Said sector preferably becomes progressively a larger angle sector as the aircraft pitch angle increases from zero in one direction and a smaller angle sector as the aircraft pitch angle increases from zero in the opposite direction.

In such an arrangement said sector is preferably a 180° angle sector when the aircraft pitch angle is zero and becomes a larger angle sector as the aircraft pitch angle increases from zero in the negative direction and becomes a smaller angle sector as the aircraft pitch angle increases from zero in the positive direction.

Said symbol may be a permanent display or it may be a selectively activatable display.

Preferably the device further includes angle display elements distributed at fixed positions around the said circular array of display elements. As with the central symbol the angle reference elements may be permanent displays or they may be selectively activatable displays.

Each said element in said circular array of display elements is suitably in the form of an individual narrow sector of a circle truncated at its radially inner end.

One display device in accordance with the invention for use as an aircraft standby attitude reference display will now be described, by way of example, with reference to the accompanying drawings in which.

Figure 1:
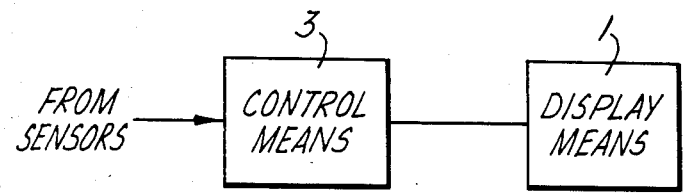
FIG. 1 is a block schematic diagram of the device.

Referring to FIG. 1, the device comprises a display means 1 operated by a control means 3 in response to inputs derived from pitch and roll sensors (not shown) provided in the aircraft.

Figure 2:
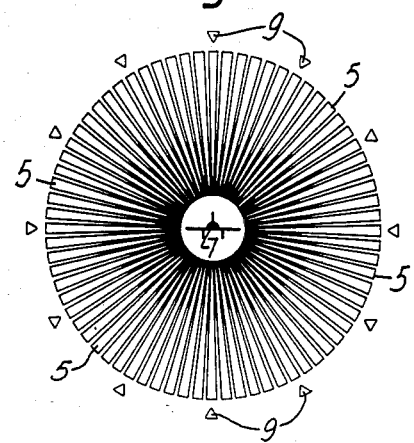
FIG. 2 is a representation of a display means incorporated in the device.

Referring to FIG. 2, the display means 1 comprises a circular array of equispaced radially extending display elements 5 which may be individually selectively activated by the control means 3 so as to be in a visible or 'on' condition, or in an invisible or 'off' condition. In FIG. 2 all the elements are shown on although in actual use some only of the elements will be on, as described below. In FIG. 2 a display of seventy-two elements 5 is shown for simplicity, but in practice a larger number of elements will normally be provided. The display elements 5 may be fabricated using any convenient technology, for example, liquid crystal display technology or light emissive diode technology. In the former case a display of at least 180 elements is relatively easily attainable.

The radially inner ends of the elements 5 define a central space in which there is a symbol 7 representative of an aircraft. The symbol 7 is fixed with respect to the frame (not shown) of the display means 1, and hence, with the display means mounted in an aircraft, is fixed with respect to the aircraft. The purpose of the symbol is to indicate the orientation of the aircraft, and thus suitably depicts an aircraft, as in FIG. 2.

The display means 1 includes further small triangular display elements 9 disposed around the outer edges of the elements 5 to provide angle references, i.e. so-called lubber points, relative to the aircraft symbol 7. In FIG. 2 horizontal and vertical references and references at thirty degree intervals there between are shown.

The symbol 7 and the elements 9 may be a permanent display, e.g. markings printed on the display area of the display means, or alternatively may be display elements selectively activatable by means of the control means 3 for display only as and when desired.

The manner in which the controls means 3 operates the display means 1 to produce a display indicative of aircraft attitude will now be described with reference to FIGS. 3 to 12.

Figure 3:
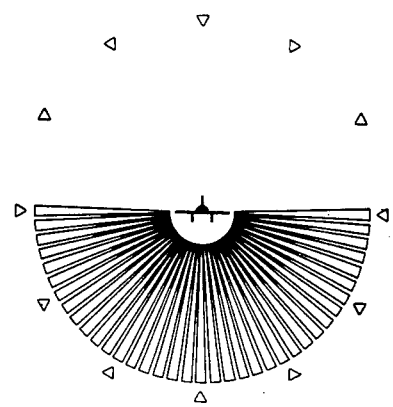
FIGS. 3 to 12 are representations of the display presented by the display means of FIG. 2 for various attitudes of an aircraft in which the device is in use.

As shown in FIG. 3, when the aircraft is in straight and level flight the control means 3 turns on that group of the elements 5 which defines the 180° sector of the array then directly below the aircraft symbol 7, i.e. the 180° sector whose middle part is then vertically below the aircraft symbol 7. The radial edges of the sector are thus horizontal and their orientation with respect to the aircraft symbol 7 indicates the orientation of the horizon with respect to the aircraft.

Figure 4:
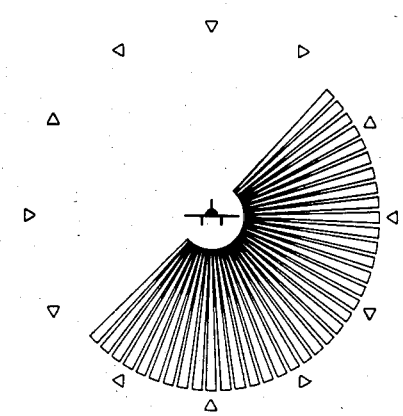

To depict roll of the aircraft the control means 3 causes the displayed sector to rotate with respect to the symbol 7 and display elements 9 by an angle equal to the roll angle. The angular orientation of the displayed sector relative to the symbol 7 and the display elements 9 then indicates the roll angle. Thus for a 45° bank to the right the display is as shown in FIG. 4. In FIGS. 3 to 12 the aircraft symbol 7 is shown in the same orientation to show clearly the changes in the elements 5 which are on.

To depict pitch of the aircraft the control means 3 causes the included angle of the displayed sector to vary, the included angle decreasing progressively below 180° as positive (nose up) pitch angle increases, and the included angle increasing progressively above 180° as negative (nose down) pitch angle increases.

Figure 5:
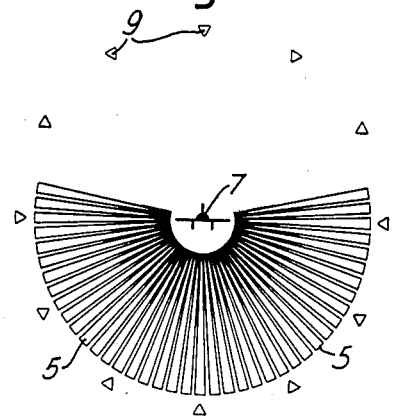
Figure 6:
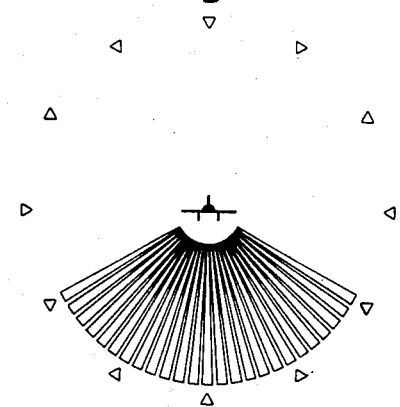

Thus FIG. 5 shows the display for a small negative pitch angle and zero roll and FIG. 6 shows the display for a somewhat larger positive pitch angle and zero roll. Zero roll is indicated in FIGS. 5 and 6 by the angular orientation of the displayed sector relative to the symbol 7 and display elements 9, i.e. by the middle part of the displayed sector lying directly underneath the aircraft depicted by the symbol 7.

FIGS. 7 to 10 show displays obtained with combined pitch and roll.

Figure 7:
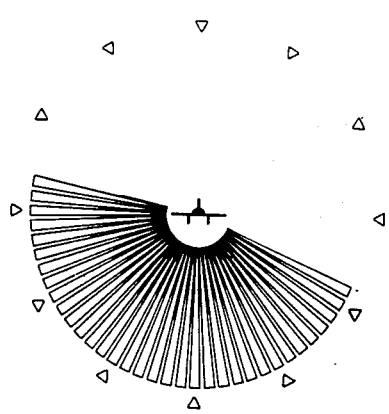
Figure 8:
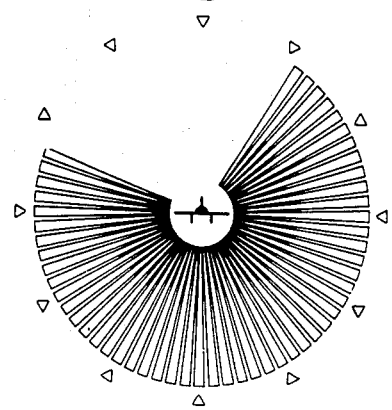

FIG. 7 shows the display obtained with the aircraft pitching slightly nose up while rolled slightly to the left, and FIG. 8 shows the display obtained with the aircraft pitching strongly nose down while rolled slightly to the right.

Figure 9:
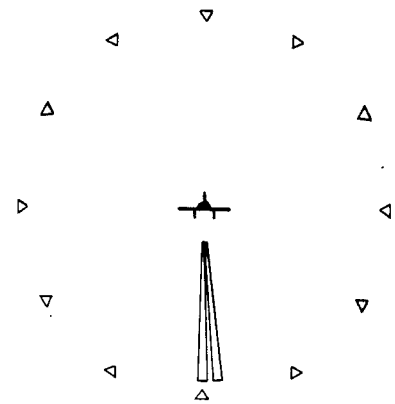
Figure 10:
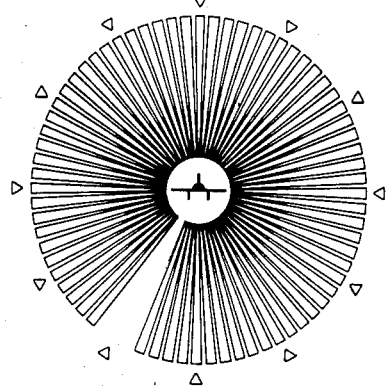

The ability of the display to provide sufficient information to enable a pilot to recover from extreme attitudes is illustrated in FIGS. 9 and 10. Thus FIG. 9 shows the display obtained with the aircraft pointing almost vertically upwards with wings almost level, and FIG. 10 shows the display obtained with the aircraft pointing almost vertically downwards and rolled 150° right, as indicated by the position of the mid point of the displayed sector relative to the display elements 9. It will be noted that in this condition the position of the small 'off' sector clearly indicates to the pilot that a 150° roll left is required to obtain the nearest horizon.

Figure 11:
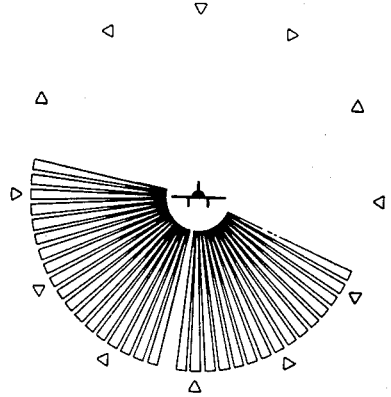
Figure 12:
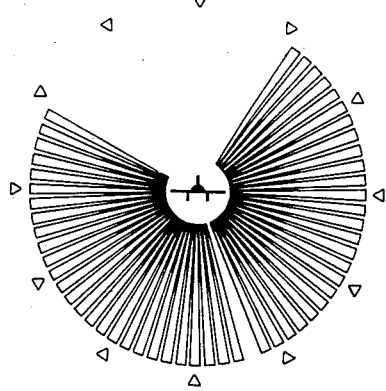

As will be apparent from the above description with reference to FIGS. 3 to 10, aircraft roll angle is indicated at any time by the position of the middle part of the displayed sector relative to the fixed display elements 9. Thus, read out of roll angle may be facilitated by not turning on one or more of the elements 5 in the region of the mid point of the displayed sector, as illustrated in FIGS. 11 and 12, which otherwise correspond respectively to the displays of FIGS. 7 and 8 respectively. This is useful in normal flight but in extreme attitudes such as depicted in FIG. 10, the missing element or elements are preferably turned on to avoid confusion with the nearest horizon indication.

The control means 3 may comprise any suitable means for addressing a display comprising an array of selectively activatable display elements, for example, a small low power micro-processor of the kind readily available in CMOS micro-electronic implementation. The display means 1 and its associated control means 3 are suitably arranged to be battery operated for long life, so avoiding the difficult problem of power consolidation from, for example, a multi-channel flight control system where electrical isolation is deemed important for flight safety reasons. Such a battery driven display device may be trickle charged from a power supply derived from one only of the flight control channels, the battery providing sufficient capacity should failure of that channel occur.

Consolidation of attitude data is readily achieved by way of fibre optic connection to the data source channels and by a voting arrangement carried out by the display control means 3 processor. In this way high integrity attitude data is provided for the display without fear of power interruption or channel isolation infringement.

For the case of flight of the aircraft straight and level it may be found that even with a 180 element array, given a two degree element separation, the display may appear too coarse to enable smooth straight and level flight. This may be overcome by arranging for the device to have a greater response (i.e. display a greater change in area and/or angular position of the displayed sector for unit change in pitch and/or roll) in the region of zero pitch and roll so that greater sensitivity is provided for a few degrees in the region of zero pitch and roll.

Figure 13:
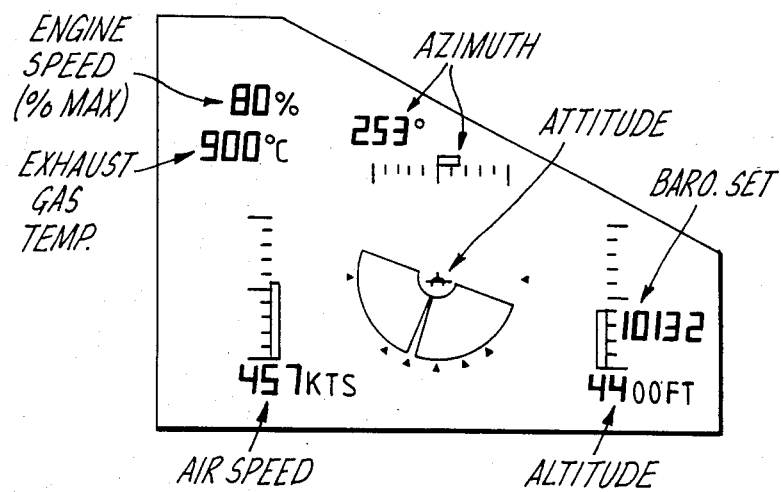
FIG. 13 shows a display device incorporating the device of FIG. 2 in association with other display devices.

An attitude display device according to the invention is suitably associated with displays of other flight parameters such as altitude, rate of climb, airspeed and heading. These are conveniently thermometer or rotary pointer representations supported where required by digital displays arranged suitably about the periphery of the attitude display, as illustrated in FIG. 13.

A display device in accordance with the invention is suitably arranged to be invisible during normal operation when the primary attitude display is operational, the standby display being energized, i.e. becoming visible, only upon failure of the primary display.

When liquid crystal display technology is used for the display, the display array is conveniently arranged to overlay the primary display, e.g. by being incorporated in a glass screen in front of the primary display, and thus to appear in the same place as the primary display.

Another possibility is to incorporate a display device according to the invention in the aircraft head-up display system, for example in the combiner glass or in a way similar to that conventionally used for standby aiming reticules.

A further possibility is to provide the attitude display device in a fold-away configuration for pilot or automatic deployment upon failure of the primary attitude display.

When the display means is a liquid crystal display device it may be flood-lit as for conventional panel instruments or may be back lit.

I claim:

1. A display device for an aircraft comprising: a circular array of radially extending selectively activatable display elements, the radially inner ends of which elements define a central space; within the said central space, a symbol fixed with respect to the aircraft in use; and means for selectively activating said display elements in accordance with aircraft attitude whereby the selected display elements form a visible pattern whose geometrical relationship with respect to said symbol is indicative of the aircraft attitude; and wherein said means for selectively activating said display elements activates a group of said elements which together form a sector of said circular array whose angular position in the array relative to said symbol is indicative of the roll angle of the aircraft; and said sector becomes progressively a larger angle sector as the aircraft pitch angle increases from zero in one direction and a smaller angle sector as the aircraft pitch angle increases from zero in the opposite direction.

2. A device according to claim 1 wherein said sector rotates about said symbol with change in the roll angle of the aircraft by an angle substantially equal to the change in the roll angle.

3. A device according to claim 2 wherein said sector is a 180° angle sector when the aircraft pitch angle is zero and becomes a larger angle sector as the aircraft pitch angle increases from zero in the negative direction and becomes a smaller angle sector as the aircraft pitch angle increases from zero in the positive direction.

4. A device according to claim 2 wherein at least one element in the middle part of said sector is not activated for normal attitudes of the aircraft.

5. A device according to claim 1 wherein said angular position of said sector and the angle of said sector change with roll and pitch angle respectively of the aircraft by larger amounts when the aircraft attitude is approximately straight and level than for other aircraft attitudes.

6. A device according to claim 1 wherein said display elements are liquid crystal display elements.

7. A device according to claim 1 further including angle reference display elements at fixed positions around said circular array of display elements.

8. A device according to claim 1 wherein said means for selectively activating said display elements comprises a microprocessor.

* * * * *